(12) United States Patent
Lazar

(10) Patent No.: US 9,886,256 B2
(45) Date of Patent: Feb. 6, 2018

(54) APPLICATION DOWNLOAD AND LINK CORRELATION

(71) Applicant: Green Almond Limited, Road Town (VG)

(72) Inventor: Mayan Lazar, Haifa (IL)

(73) Assignee: Green Almond Limited, Tortola (VG)

( * ) Notice: Subject to any disclaimer, the term of this patent is extended or adjusted under 35 U.S.C. 154(b) by 144 days.

(21) Appl. No.: 14/849,888

(22) Filed: Sep. 10, 2015

(65) Prior Publication Data

US 2017/0075670 A1 Mar. 16, 2017

(51) Int. Cl.
*G06F 9/445* (2006.01)
*H04L 29/06* (2006.01)

(52) U.S. Cl.
CPC ............ *G06F 8/61* (2013.01); *H04L 63/0442* (2013.01)

(58) Field of Classification Search
CPC ................................ G06F 8/61; H04L 63/0442
See application file for complete search history.

(56) References Cited

U.S. PATENT DOCUMENTS

| | | | | |
|---|---|---|---|---|
| 5,960,411 A * | 9/1999 | Hartman | .............. | G06Q 10/087 |
| | | | | 705/26.8 |
| 8,271,788 B2 | 9/2012 | Dancer et al. | | |
| 9,483,783 B1 * | 11/2016 | Power | ................ | G06Q 30/0601 |
| 2003/0120542 A1 * | 6/2003 | Arning | .................. | G06Q 30/02 |
| | | | | 705/14.35 |
| 2008/0091947 A1 * | 4/2008 | Dancer | ............... | H04L 63/0442 |
| | | | | 713/171 |
| 2008/0183859 A1 * | 7/2008 | Aaron | .................... | G06Q 30/02 |
| | | | | 709/224 |
| 2013/0278622 A1 * | 10/2013 | Sun | ........................ | G06Q 20/22 |
| | | | | 345/589 |
| 2013/0332518 A1 * | 12/2013 | Chor | ........................ | G06F 8/61 |
| | | | | 709/203 |
| 2013/0341391 A1 * | 12/2013 | Vellozo Luz | ..... | G06F 17/30879 |
| | | | | 235/375 |

FOREIGN PATENT DOCUMENTS

KR 10-2013-0062305 6/2013
KR 10-1473471 12/2014

OTHER PUBLICATIONS

Viliam Holub et al., Run-Time Correlation Engine for System Monitoring and Testing, ACM, 2009, retrieved online on Oct. 4, 2017, pp. 43-44. Retrieved from the Internet: <URL: http://delivery.acm.org/10.1145/1560000/1555237/p43-holub.pdf?>.*

* cited by examiner

*Primary Examiner* — Hanh T Bui

(57) ABSTRACT

A method of for correlating download link access and application installation, comprising: detecting a loading event during which a browser installed on a client terminal is loading a web document which includes instructions for downloading a software application; identifying at least one first identity parameter indicative of a user and received from the browser; storing the at least one first identity parameter in a memory accessible by at least one server; identifying at least one second identity parameter of the user by an execution of the software application by a processor of the client terminal; and matching between the at least one first identity parameter and the at least one second identity parameter to identify a correlation between the loading event of the web document and the downloading event of the software application.

19 Claims, 2 Drawing Sheets

APPLICATION DOWNLOAD AND LINK CORRELATION

FIELD AND BACKGROUND OF THE INVENTION

The present invention, in some embodiments thereof, relates to acquiring user information and, more particularly, but not exclusively, to correlating user information obtained by download link and by a program.

Users of electronic mobile devices and/or computers are prompted to download and install programs and/or applications. This is done for example by sending a user an email message or a text message that includes a link. The link is directing to a download page or a download platform of the program and/or application. After download, the program and/or application is installed automatically or by the user.

SUMMARY OF THE INVENTION

According to an aspect of some embodiments of the present invention there is provided a method of for correlating download link access and application installation, comprising: detecting a loading event during which a browser installed on a client terminal is loading a web document which includes instructions for downloading a software application; identifying at least one first identity parameter indicative of a user and received from the browser; storing the at least one first identity parameter in a memory accessible by at least one server; identifying at least one second identity parameter of the user by an execution of the software application by a processor of the client terminal; and matching between the at least one first identity parameter and the at least one second identity parameter to identify a correlation between the loading event of the web document and the downloading event of the software application.

Optionally, at least one of the at least one first identity parameter is used for personalizing the software application to the user.

Optionally, at least one of the at least one first identity parameter is automatically filled in a form presented to the user in a user interface of the software application.

More optionally, when the at least one first identity parameter is identical for a plurality of users, the at least one first identity parameter is not automatically filled in the form to prevent wrong filling of the form.

More optionally, the at least one first identity parameter is automatically filled in the form when the execution is performed within a predetermined period of time after the loading event.

Optionally, the correlation is identified for a plurality of users and is analyzed by a processor to produce data of installations of the software application.

More optionally, the installations data includes one of a conversion rate of the web document views to installations of the software application, statistical data of installations of the software application.

More optionally, the installations data is used for commercial improvement for the software application.

Optionally, at least one of the at least one first identity parameter is included in a uniform resource locator (URL) directing to the web document, the URL is accessed by the browser before the loading.

More optionally, the URL is provided to the client terminal by one of an email message and a text message received by the client terminal.

Optionally, the at least one first identity parameter includes one of an internet protocol (IP) address, user agent, a type of the client terminal, an identification number of the client terminal and a location of the client terminal.

Optionally, the at least one of the at least one first identity parameter is inputted in the web document via the browser.

Optionally, the instructions includes a link to a second web document containing an address of the software application, the second web document is loaded by the browser.

Optionally, the at least one of the at least one first identity parameter is inputted in the second web document via the browser.

Optionally, the instructions includes a script for automatically loading a second web document containing an address of the software application, the script is executed by the browser.

Optionally, the client terminal is a mobile device, the software application is a mobile application and the instructions include a link to a mobile application distribution platform.

More optionally, the downloading includes providing payment by the user via the mobile application distribution platform.

According to some embodiments of the invention there is provided a computer readable medium comprising computer executable instructions adapted to perform the method.

According to an aspect of some embodiments of the present invention there is provided a system for correlating download link access and application installation, comprising: a memory accessible by at least one server, for storing at least one first identity parameter of a user; a code store for storing a code; a processor, connected to the interface and the code store, adapted to implement the code; wherein the code comprises: code to detect a loading event during which a browser installed on a client terminal is loading a web document which includes instructions for downloading a software application code to identify the at least one first identity parameter indicative of a user and received from the browser; code to identify at least one second identity parameter of the user by an execution of the software application by a processor of the client terminal; and code to match between the at least one first identity parameter and the at least one second identity parameter to identify a connection between the loading event of the web document and the downloading event of the software application.

According to an aspect of some embodiments of the present invention there is provided a method of for correlating download link access and application installation, comprising: detecting a loading event during which a browser installed on a client terminal is loading a web document which includes instructions for downloading a software application; identifying at least one first identity parameter indicative of a user and stored by the browser in a cookie file on a memory of the client terminal; loading the cookie file by an execution of the software application by a processor of the client terminal; identifying at least one second identity parameter of the user by an execution of the software application by a processor of the client terminal; and matching between the at least one first identity parameter and the at least one second identity parameter to identify a correlation between the loading event of the web document and the downloading event of the software application.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

Figure 1:
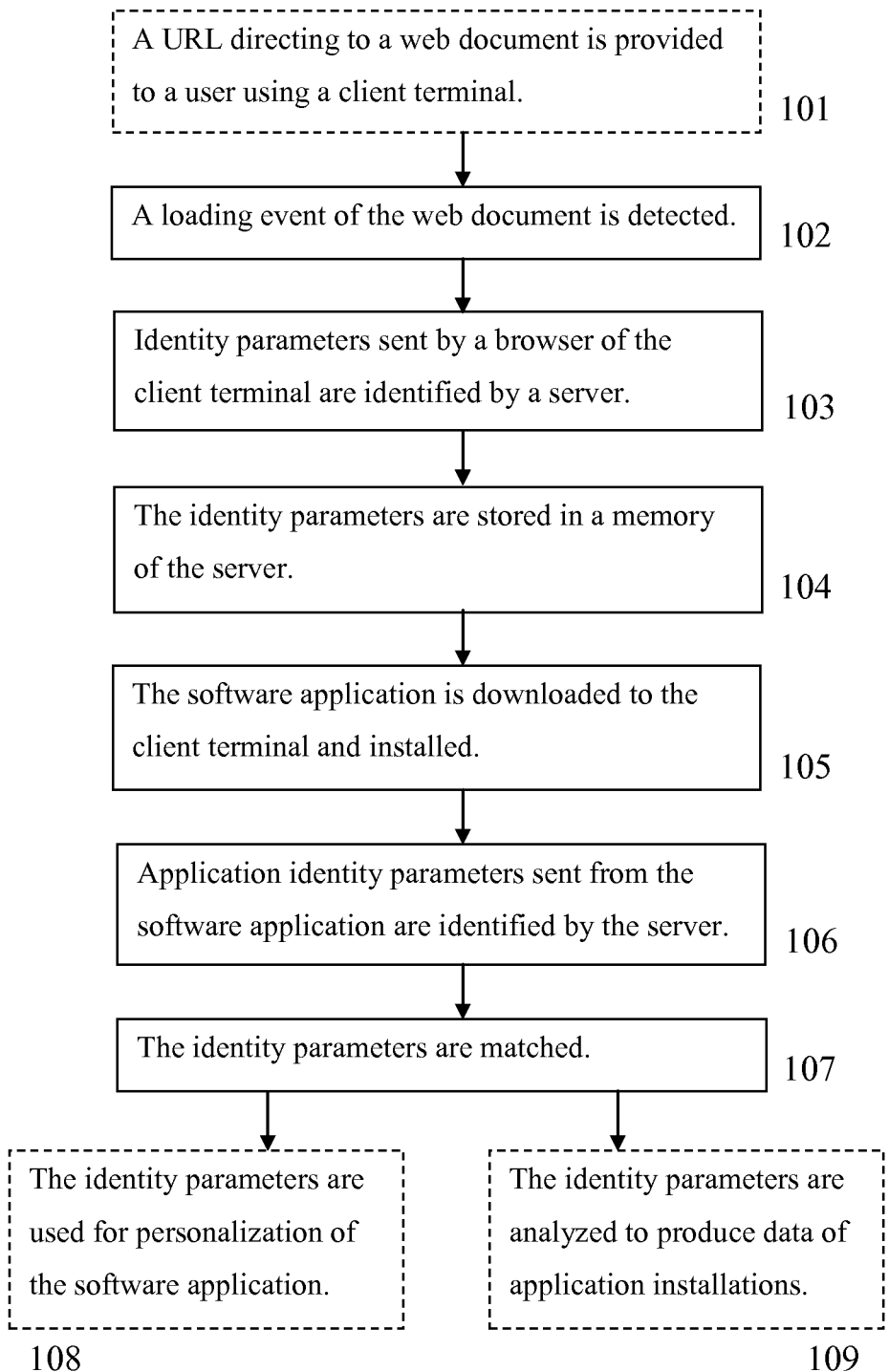
FIG. 1 is a flowchart schematically representing a method for correlating download link access and application installation by matching identity parameters, according to some embodiments of the present invention.

The present invention, in some embodiments thereof, relates to acquiring user information and, more particularly, but not exclusively, to correlating user information obtained by download link and by a program.

It may be useful for commercial reasons and for enhancing user experience to correlate between a link that a user accesses in order to download an application, for example on an application store, to the same user who installs the application and opens it. For example, when a user opens a link from a text message received by a client application running on his mobile phone, it may be useful to determine, after the user installs the application, that this is the same user. This identification information of the user enables, for example, to provide better user interface flow in applications and to monitor installations of an application by users for data analysis.

According to some embodiments of the present invention, there is provided a method for correlating between a download link access of a user to download an application and the application installation on a client terminal of the user. The method first includes receiving, by a server, identity parameter(s) of a user from a browser installed on a client terminal of the user, such as a computer or a mobile device. The browser is loading a web document which includes instructions, such as a link to a download page, for downloading a software application, such as a mobile app. The identity parameters may be contained, for example, in a uniform resource locator (URL) that the user received by email or text message and transferred to the server from the browser. The method further includes storing the identity parameters in a memory of the server. After the application is installed on the client terminal, receiving identity parameters from the software application that are sent to the server, and matching them to the identity parameters stored in the memory. The matching is done to determine correlation between the loading event, when the browser loaded the web document, and the downloading event, when the software application was downloaded and installed on the client terminal, thus identifying the user who downloaded the application as the user who accessed the web document.

Optionally, some of the identity parameters stored in the memory may then be sent by the server to the client terminal and used by the software application for enhancing user experience. For example, to pre-fill forms presented to the user. This enhancement may be paused when the matching of the parameters in inconclusive.

Optionally, some of the identity parameters stored in the memory may then be analyzed and/or monitored, for example to provide demographic data of users downloading the application and/or to determine a conversion rate of the email or text message sent to users.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
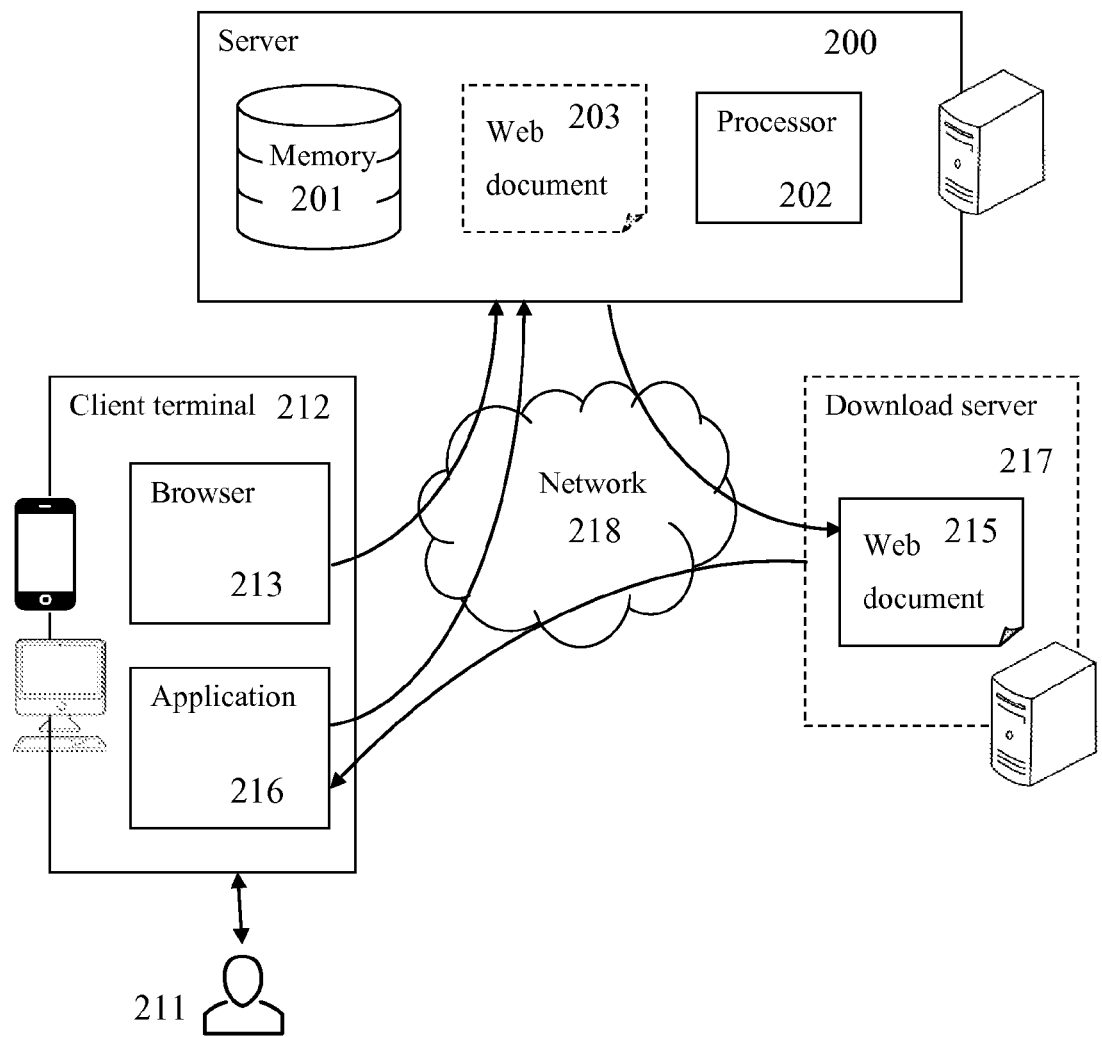
FIG. 2 is a schematic illustration of a system of correlating download link access and application installation, according to some embodiments of the present invention.

Referring now to the drawings, FIG. 1 is a flowchart schematically representing a method for correlating download link access by a user and application installation by the same user, by matching identity parameters sent to a server by a browser of a client terminal and by the application installed on the client terminal, according to some embodiments of the present invention. Reference is also made to FIG. 2, which is a schematic illustration of a server for correlating download link access and application installation, according to some embodiments of the present invention.

The method is performed by a server 200 which is connected to a client terminal 212 via a network 218. Server 200 may include one or more computing devices, for example, a mainframe computer, an enterprise server, a workstation, multiple connected computers and/or a personal computer.

Client terminal 212 may include, for example, a mobile device such as a Smartphone, a tablet, a wearable device such as Google glass, a Smart watch, a laptop computer and/or the like, a personal computer and/or any device that has one or more network communication modules, such as a network card or chip.

Network 218 may include, for example, local area network (LAN), a wireless network such as mobile network, wireless local area network (WLAN) such as Wireless Fidelity (WiFi™), a wireless personal area network (WPAN) such as Bluetooth™ protocol and/or any other network.

First, optionally, as shown at 101, a URL directing to a web document 203 is provided to a user 211 that is using client terminal 212. The web document 203 may then be loaded by a browser 213 installed on client terminal 212. Optionally, the URL includes one or more identity parameters indicative of user 211.

The identity parameters may include, for example, an internet protocol (IP) address, the user agent of the browser, type of client terminal 212, hardware profile of client terminal 212 such as screen size, central processing unit (CPU) and/or memory, phone number used by client terminal 212, identification number of client terminal 212 and location of client terminal 212. Optionally, the identity parameters include an email address used by user 211, for example using account manager rights from email service(s) running on client terminal 212. Optionally, the identity parameters include information used as a signature of client terminal 212, for example, a list of applications installed on client terminal 212, a list of previously connected WiFi networks by client terminal 212 and/or the WiFi network that is currently connected. Optionally, the URL may include Urchin tracking module (UTM) conventions with identity parameters such as utm_source, utm_campaign and/or utm_medium.

The URL may be provided by server 200. The URL may be included in an email message, a text message and/or other electronic message sent to client terminal 212 via network 218.

Web document 203 may be, for example, a webpage, an extensible markup language (XML) page, a hypertext markup language (HTML) page, a portable document format (PDF), an executable, an email, an audio and/or video file, an image and/or any other network accessible content file.

Then, as shown at 102, a loading event during which browser 213 is loading web document 203 is detected by server 200. Web document 203 includes instructions for downloading a software application 216.

Software application 216 may be, for example, a mobile application, a program for a computer and/or any other kind of executable file(s) that may be executed by a processor.

Optionally, the instruction for downloading software application 216 includes an address, such as a link, to a download page 215. Download page 215 may be any kind of web document as described above, that includes a link, a script and/or any kind of operation for downloading software application 216 to client terminal 212. For example, download page 215 may be an HTML document including a link to a file of software application 216. Optionally, download page 215 may be included in a mobile application distribution platform such as Apple App Store, Google Play and/or other application stores. Optionally, user 211 provides payment for downloading software application 216 via the mobile application distribution platform.

Download page 215 and/or Software application 216 may be stored in a download server 217, which may be any kind of server as described above.

Optionally, a cookie file is installed in a memory of client terminal 212 by browser 213 when loading web document 203. The cookie file may include the identity parameters.

Then, as shown at 103, the identity parameters are sent to server 200 by browser 213, and are identified by server 200.

Optionally, web document 203 is stored in server 200, so when user 211 accesses the URL and browser 213 loads web document 203, the identity parameters are directly transferred to server 200 from browser 213. Optionally, web document 203 is stored in a second server and the identity parameters are transferred to server 200 from the second server via network 218.

Then, as shown at 104, the identity parameters are stored in a memory 201 of server 200. Memory 201 may include, for example, a digital data storage unit such as a magnetic drive and/or a solid state drive. Memory 201 may also include, for example, a content delivery network or content distribution network (CDN) that is a large distributed system of servers deployed in multiple data centers across the internet. The identity parameters may be stored in a dataset included in memory 201, which may be any kind of structured data collection that allows access to stored data.

Then, as shown at 105, software application 216 is downloaded to client terminal 212 via network 218 and installed on client terminal 212. This may be done automatically for example by browser 213 and/or following a command by user 211. For example, user 211 may press an "install" button on a download page presenting a mobile application on Google Play, and the mobile application is downloaded and automatically installed on his mobile device.

Then, the software application 216 is loaded and executed by a processor of client terminal 212. This may be, for example, in response to an action by user 211 of opening software application 216.

Then, as shown at 106, one or more of application identity parameters of user 211 are sent from software application 216 to server 200 via network 218 and are identified by server 200. The application identity parameters are acquired by the execution of software application 216 by a processor of client terminal 212. The application identity parameters may include some or all of the identity parameters included in the URL. The application identity parameters may also include other identity parameters not included in the URL. The application identity parameters may be automatically extracted by software application 216 from client terminal 212 and/or may be entered by user 211 when installing and/or using software application 216.

Then, as shown at 107, the identity parameters stored in memory 201 are matched to the application identity parameters, by a processor 202 of server 200. This may be done, for example, by a search algorithm executed on processor 202, which searches entries of identity parameters of multiple users stored in a dataset of memory 201 and finds such identity parameters which are similar to the application identity parameters.

The identity parameters stored in memory 201 provide indication of the loading event, which is when browser 213 loaded web document 203. The application identity parameters provide indication of the downloading event, when software application 216 was downloaded and installed on client terminal 212. Therefore, matching between the identity parameters stored in memory 201 and the application identity parameters identifies correlation between the loading event and the downloading event. The correlation is an indication for identifying the user who downloaded the application as the user who accessed the web document.

Optionally, when a cookie was installed in a memory of client terminal 212, the cookie file is opened by software application 216, for example when software application 216 has browser opening permissions in client terminal 212. Then, the identity parameters stored on the cookie file may be matched to the application identity parameters.

Optionally, as shown at 108, the identity parameters stored in memory 201 are sent to client terminal 212 to be used by software application 216 for personalizing to user 211. For example, the user interface and/or content of software application 216 may be modified to fit characteristics of user 211, according to the identity parameters. Optionally, one or more of the identity parameters may be pre-filled in a form presented to user 211 in a user interface of software application 216. For example, an email address of user 211 may be included in a registration screen when user 211 first opens software application 216.

When multiple related users having some identity parameters identical, for example users of client terminals that are behind a network address translation (NAT) system which may have the same IP and possibly the same device type, are accessing web document 203 and downloading software application 216, matching a specific user parameters may be inconclusive.

Optionally, in this case, personalization software application 216 of is paused to prevent from using wrong identity parameters for personalization. For example, an email address is not included in a registration screen for these users.

Optionally, the time of accessing web document 203 and the time of downloading software application 216 are stored in memory 201, and the time difference between the time of accessing web document 203 and the time of downloading software application 216 is calculated by processor 202 and is used for matching specific user parameters.

Optionally, when the time difference is larger than a predetermined period of time, for example, 5 minutes, 10 minutes and/or any other period, personalization of software application 216 is paused.

Optionally, as shown at 109, the identity parameters stored in memory 201, for multiple users, are analyzed to produce data of installations of software application 216. The data may include, for example, a conversion rate of users viewing web document 203 to users who installing software application 216. The data may include statistical data of installations of software application 216, such as demographic information and/or use patterns of software application 216. This may help, for example, increase the value of commercial and/or promotional efforts.

An exemplary scenario of using the method according to some examples of the present invention is now presented. A user is identified by a commercial promotion algorithm as a part of a target group for downloading a mobile app. A server sends a promotion message to the user's email address; the message includes suggestion to download the application and a URL link for downloading the mobile app. The URL is directing to a web document and also includes the name and email address of the user. The user views the message via an email application on his mobile phone. The user clicks on the URL link, and a browser application on his mobile phone opens and loads the web document. During the loading of the web document, the name and email address of the user are sent by the browser to the server, and then are stored on a memory of the server. The web document includes a forward script, so when the browser loads the web document, it executes the script and loads a download page of the mobile app that is part of an application store. The user then downloads the mobile app and it is installed on his mobile phone. When the user opens the mobile app, the mobile app accesses the user's accounts information on his mobile phone, and then sends the user's email address to the server. Then, this email address is matched with the name and email address included in the URL and stored in the server's memory. Then, the server sends the name of the user to the mobile app installed on the user's mobile phone. A registration form is then presented to the user in the mobile application, and the user's name is presented in the 'Name' field of the form, so it is easier for the user to fill the form and register. Also, the server updates a calculated conversion rate of the downloads of the mobile app following the promotion messages sent to users, and the commercial promotion algorithm for selecting the target group is updated according to the conversion rate.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant methods and systems for correlating user information will be developed and the scope of the term user information is intended to include all such new technologies a priori.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for correlating download link access and application installation, comprising:
   detecting, by a server, a web document loading event during which a browser installed on a client terminal is loading a web document stored on a download server different from said server, said web document includes instructions for software application downloading of a software application;
   identifying, by said server, at least one first identity parameter indicative of a user and received from said browser, upon said detecting;
   storing said at least one first identity parameter in a memory accessible by at least said server;
   identifying at least one second identity parameter of said user by an execution of said software application by a processor of said client terminal;
   matching between said at least one first identity parameter and said at least one second identity parameter to identify a correlation between said web document loading event of said web document and a software application downloading event during which said software application is downloaded by said client terminal from said download server;
   upon identifying said correlation, performing at least one of:
      sending said at least one first identity parameter to said processor of said client terminal and modifying a user interface presentation on said client terminal by said processor, according to said at least one first identity parameter received by said processor, and
      analyzing said correlation and producing data of installations of said software application, when said correlation is identified for a plurality of users.

2. The method of claim 1, wherein at least one of said at least one first identity parameter is used for personalizing said software application to said user.

3. The method of claim 1, wherein at least one of said at least one first identity parameter is automatically filled in a form presented to said user in a user interface of said software application.

4. The method of claim 3, wherein when said at least one first identity parameter is identical for a plurality of users, said at least one first identity parameter is not automatically filled in said form to prevent wrong filling of said form.

5. The method of claim 3, wherein said at least one first identity parameter is automatically filled in said form when said execution is performed within a predetermined period of time after said web document loading event.

6. The method of claim 1, wherein said installations data includes one of a conversion rate of said web document views to installations of said software application, and statistical data of installations of said software application.

7. The method of claim 1, wherein said installations data is used for commercial improvement for said software application.

8. The method of claim 1, wherein at least one of said at least one first identity parameter is included in a uniform resource locator (URL) directing to said web document, said URL is accessed by said browser before said loading.

9. The method of claim 8, wherein said URL is provided to said client terminal by one of an email message and a text message received by said client terminal.

10. The method of claim 1, wherein said at least one first identity parameter includes one of an internet protocol (IP) address, user agent, a type of said client terminal, an identification number of said client terminal and a location of said client terminal.

11. The method of claim 1, wherein at least one of said at least one first identity parameter is inputted in said web document via said browser.

12. The method of claim 1, wherein said instructions includes a link to a second web document containing an address of said software application, said second web document is loaded by said browser.

13. The method of claim 1, wherein said at least one of said at least one first identity parameter is inputted in a second web document via said browser.

14. The method of claim 1, wherein said instructions includes a script for automatically loading a second web document containing an address of said software application, said script is executed by said browser.

15. The method of claim 1, wherein said client terminal is a mobile device, said software application is a mobile application and said instructions include a link to a mobile application distribution platform.

16. The method of claim 15, wherein said downloading includes providing payment by said user via said mobile application distribution platform.

17. A non-transitory computer readable storage medium comprising computer executable instructions adapted to perform the method of claim 1.

18. A system for correlating download link access and application installation, comprising:
   a memory accessible by at least one server, for storing at least one first identity parameter of a user;
   a code store for storing a code;
   a processor, connected to said interface and said code store, adapted to implement said code;

wherein said code comprises:
code to detect a web document loading event during which a browser installed on a client terminal is loading a web document stored on a download server different from said at least one server, said web document includes instructions for software application downloading of a software application;
code to identify said at least one first identity parameter indicative of a user and received from said browser, upon said detecting;
code to identify at least one second identity parameter of said user by an execution of said software application by a processor of said client terminal; and
code to match between said at least one first identity parameter and said at least one second identity parameter to identify a connection between said web document loading event of said web document and a software application downloading event during which said software application is downloaded by said client terminal from said download server;
code to at least:
  send said at least one first identity parameter to said processor of said client terminal, upon identifying said connection and to modify a user interface presentation on said client terminal by said processor of said client terminal, according to said at least one first identity parameter, received by said processor of said client terminal,
  and
  analyze said correlation and produce data of installations of said software application, when said correlation is identified for a plurality of users.

19. A method for correlating download link access and application installation, comprising:

detecting, by a server, a web document loading event during which a browser installed on a client terminal is loading a web document stored on a download server different from said server, said web document includes instructions for software application downloading of a software application;
identifying at least one first identity parameter indicative of a user and stored by said browser in a cookie file on a memory of said client terminal;
loading said cookie file by an execution of said software application by a processor of said client terminal;
identifying at least one second identity parameter of said user by an execution of said software application by a processor of said client terminal;
matching between said at least one first identity parameter and said at least one second identity parameter to identify a correlation between said web document loading event of said web document and a software application downloading event during which said software application is downloaded by said client terminal from said download server;
upon identifying said correlation, performing at least one of:
  sending said at least one first identity parameter to said processor of said client terminal and modifying a user interface presentation on said client terminal by said processor, according to said at least one first identity parameter received by said processor,
  and
  analyzing said correlation and producing data of installations of said software application, when said correlation is identified for a plurality of users.

* * * * *